United States Patent
Yau et al.

(10) Patent No.: US 8,153,920 B2
(45) Date of Patent: Apr. 10, 2012

(54) TOUCH PANEL ROLL AND MANUFACTURING METHOD THEREOF

(75) Inventors: Bao-Shun Yau, Kaohsiung (TW); Chih-Chiang Lu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 230 days.

(21) Appl. No.: 12/753,101

(22) Filed: Apr. 2, 2010

(65) Prior Publication Data

US 2011/0192636 A1 Aug. 11, 2011

(30) Foreign Application Priority Data

Feb. 8, 2010 (TW) .............................. 99103791 A (51) Int. Cl.
*H01H 1/10* (2006.01)

(52) U.S. Cl. ...................................................... 200/512

(58) Field of Classification Search .......... 200/511–512, 200/5 A, 600, 310, 314, 317; 341/22, 32–34; 345/156, 168, 169, 173–174, 176
See application file for complete search history.

(56) References Cited

U.S. PATENT DOCUMENTS

| | | | |
|---|---|---|---|
| 4,250,495 A * | 2/1981 | Beckerman et al. ............ 341/33 |
| 4,596,905 A * | 6/1986 | Fowler ........................... 200/5 A |
| 6,424,339 B1 | 7/2002 | Randall | |
| 6,583,935 B1 | 6/2003 | Saif et al. | |
| 7,067,756 B2 | 6/2006 | Cok | |
| 7,163,733 B2 | 1/2007 | Bourdelais et al. | |
| 7,196,281 B2 | 3/2007 | Cok et al. | |
| 7,199,322 B2 | 4/2007 | Bourdelais et al. | |
| 7,208,691 B2 | 4/2007 | Bourdelais et al. | |
| 7,230,198 B2 | 6/2007 | Cok et al. | |
| 2005/0274596 A1* | 12/2005 | Nashiki et al. ................. 200/512 |
| 2006/0102463 A1* | 5/2006 | Cok .............................. 200/512 |

* cited by examiner

*Primary Examiner* — Edwin A. Leon
(74) *Attorney, Agent, or Firm* — Jianq Chyun IP Office (57) ABSTRACT

A touch panel roll and a manufacturing method thereof are provided. The method includes providing a first structure roll and a second structure roll. A manufacturing method of the first structure roll includes forming an opening in a first flexible substrate, wherein conductive lines respectively connected with electrodes extend to the opening. A manufacturing method of the second structure roll includes forming conductive lines respectively connected with electrodes and independent conductive lines corresponding to the conductive lines in the first structure roll on a second flexible substrate, wherein one end of each conductive line in the second structure roll is located at a position corresponding to the opening. The method further includes laminating the first structure roll and the second structure roll by a roll-to-roll process.

17 Claims, 6 Drawing Sheets

TOUCH PANEL ROLL AND MANUFACTURING METHOD THEREOF

CROSS-REFERENCE TO RELATED APPLICATION

This application claims the priority benefit of Taiwan application serial no. 99103791, filed on Feb. 8, 2010. The entirety of the above-mentioned patent application is hereby incorporated by reference herein and made a part of specification.

BACKGROUND OF THE INVENTION

1. Field of the Invention

The present invention relates to a touch panel roll and a manufacturing method thereof.

2. Description of Related Art

With development of display technology, displays are widely used to facilitate people's daily life. Along with a general trend of pursuing characteristics of light and slim of the display, a flat panel display (FPD) becomes popular recently.

As the FPD is widely used, touch panels used for replacing input devices such as keyboards and mice become popular, so as to facilitate utilization of various information products. For example, a car touch panel can be used for car navigation. Moreover, touch panels are widely used in human-controlled machines such as game machines, public information systems (including vending machines, bank automatic teller machines (ATMs) and guide systems), personal digital assistants (PDAs), e-books, etc.

Presently, regarding a manufacturing method of the touch panel, transparent thin films and glass substrates are first cut into desired sizes. Then, electrodes, wires, spacers and isolation layers are formed on each transparent thin film and each glass substrate. Thereafter, the transparent thin films and the glass substrates are adhered to form the touch panel.

However, the above manufacturing process of the touch panel is rather complicated, and adhesion and alignment between the transparent thin film and the glass substrate may consume a plenty of manpower and time. After the touch panel is manufactured, a circuit board has to be inserted into the touch panel through a manual approach, which is of no avail for mass production. Moreover, the adhesion and alignment performed through manpower may lead to a problem of a production yield reduction.

SUMMARY OF THE INVENTION

The present invention is directed to a method for manufacturing a touch panel roll, by which an alignment accuracy between substrates can be effectively improved, and a manufacturing time can be reduced.

The present invention is directed to a touch panel roll, which can simplify a step of connecting a circuit board to a touch panel, and shortens a process time thereof.

The present invention provides a method for manufacturing a touch panel roll. The method can be described as follows. A first structure roll and a second structure roll are first provided, and a method of forming the first structure roll is as follows. A first transparent conductive layer is first formed on a first flexible substrate. Then, a first electrode and a second electrode parallel to the first electrode are formed on the first transparent conductive layer. Then, a first conductive line electrically connected to the first electrode and a second conductive line electrically connected to the second electrode are formed on the first flexible substrate. Then, an insulation layer is formed on the first electrode, the second electrode, the first conductive line and the second conductive line. Then, an opening is formed in the first flexible substrate aside the first transparent conductive layer, wherein the first conductive line and the second conductive line extend to the opening, and the insulation layer exposes the first conductive line and the second conductive line located around the opening. A method of forming the second structure roll is as follows. A second transparent conductive layer is first formed on a second flexible substrate. Then, a third electrode and a fourth electrode parallel to the third electrode are formed on the second transparent conductive layer, wherein an extending direction of the third electrode and the fourth electrode is perpendicular to an extending direction of the first electrode and the second electrode. Then, a third conductive line electrically connected to the third electrode, a fourth conductive line electrically connected to the fourth electrode, and a fifth conductive line and a sixth conductive line are formed on the second flexible substrate, and a part of the third conductive line, a part of the fourth conductive line, the fifth conductive line and the sixth conductive line are located at a position corresponding to the opening. A spacer is formed on the second transparent conductive layer. Then, the first structure roll and the second structure roll are laminated through a roll-to-roll process, so that the fifth conductive line and the sixth conductive line are respectively connected to the first conductive line and the second conductive line.

The present invention provides a touch panel roll including a plurality of panel units. Each of the panel units includes a first flexible substrate having an opening, a second flexible substrate, a first transparent conductive layer, a second transparent conductive layer, a first electrode and a second electrode parallel to the first electrode, a first conductive line electrically connected to the first electrode, a second conductive line electrically connected to the second electrode, a third electrode and a fourth electrode parallel to the third electrode, a third conductive line electrically connected to the third electrode, a fourth conductive line electrically connected to the fourth electrode, a fifth conductive line, a sixth conductive line, an insulation layer and a spacer. The second flexible substrate is disposed opposite to the first flexible substrate. The first transparent conductive layer is disposed on the first flexible substrate. The first electrode and the second electrode are disposed on the first transparent conductive layer. The first conductive line and the second conductive line are disposed on the first flexible substrate, wherein the first conductive line and the second conductive line extend to the opening. The second transparent conductive layer is disposed on the second flexible substrate. The third electrode and the fourth electrode are disposed on the second transparent conductive layer, wherein an extending direction of the third electrode and the fourth electrode is perpendicular to an extending direction of the first electrode and the second electrode. The third conductive line, the fourth conductive line, the fifth conductive line and the sixth conductive line are disposed on the second flexible substrate. And the opening exposes a part of the third conductive line, a part of the fourth conductive line, the fifth conductive line and the sixth conductive line. The fifth conductive line and the sixth conductively line are respectively connected to the first conductive line and the second conductive line. The insulation layer is disposed between the first transparent conductive layer and the second transparent conductive layer for covering the first electrode, the second electrode, the third electrode, the fourth electrode, a part of the first conductive line, a part of the second conductive line, a part of the third conductive line and a part of the fourth conductive line. The spacer is disposed between the first transparent conductive layer and the second transparent conductive layer.

According to the above descriptions, in the present invention, the roll-to-roll process is used to manufacture the upper and lower structure rolls and laminate the two structure rolls, so that the manufactured touch panel roll is convenient for delivery. Moreover, since the upper structure roll and the lower structure roll are laminated through the roll-to-roll process, an alignment error generated due to manual lamination can be avoided. In addition; utilization of the roll-to-roll process can also effectively reduce a manufacturing time of the touch panel, and reduce a waste of labour cost. Moreover, in each of the panel units of the touch panel roll, the conductive lines connected to the electrodes are located on a same plane and are exposed by the opening, so that in a follow-up manufacturing process, a circuit board can be directly attached to the opening to electrically connect to the conductive lines. In this way, the manufacturing process is simplified and the circuit board can even be attached without using a manual approach.

In order to make the aforementioned and other features and advantages of the present invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
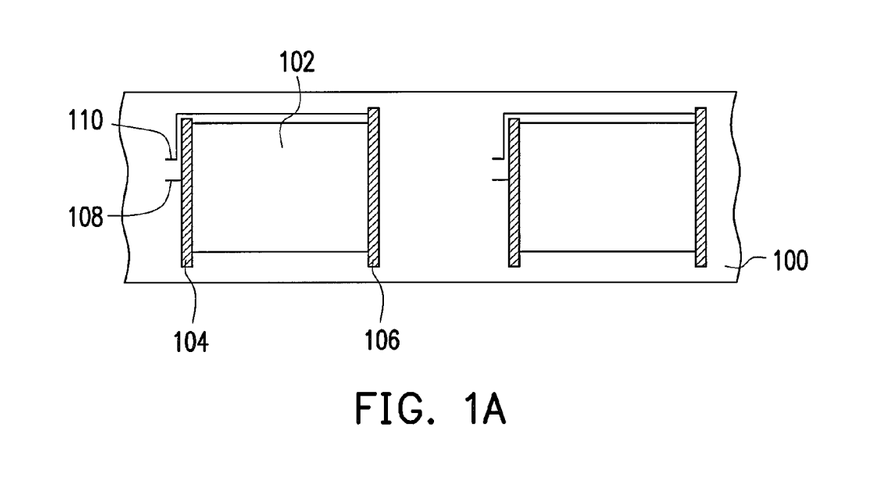
FIGS. 1A and 1B are top views illustrating a manufacturing process of a first structure roll according to an embodiment of the present invention.
Figure 1B:
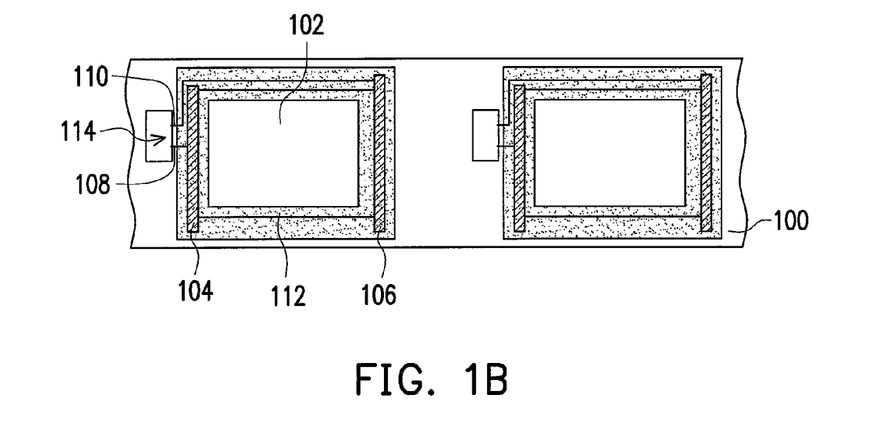

FIGS. 1A and 1B are top views illustrating a manufacturing process of a first structure roll according to an embodiment of the present invention. In the present embodiment, the first structure roll can be regarded as an upper structure of a touch panel. First, referring to FIG. 1A, a transparent conductive layer 102 is formed on a flexible substrate 100. A material of the flexible substrate 100 is, for example, polyethylene terephthalate or polycarbonate. A material of the transparent conductive layer 102 is, for example, a transparent conductive oxide (for example, indium tin oxide), an organic transparent conductive material (such as poly (3,4-ethylenedioxythiophene):polystyrene sulfonate) or carbon nanotube. A method of forming the transparent conductive layer 102 can be described as follows. First, a transparent conductive material layer is formed on the flexible substrate 100, and then a photoresist material roll and the flexible substrate are laminated through a roll-to-roll process. Then, a patterning process is performed to remove a part of the transparent conductive material layer.

Referring to FIG. 1A again, an electrode 104 and an electrode 106 parallel to the electrode 104 are formed on the transparent conductive layer 102. And conductive lines 108 and 110 are formed on the flexible substrate 100. A material of the electrodes 104 and 106 is, for example, a conductive silver paste, and a material of the conductive lines 108 and 110 is, for example, also a conductive silver paste, though the present invention is not limited thereto. The electrodes 104 and 106 and the conductive lines 108 and 110 are, for example, formed by a printing process, though the present invention is not limited thereto. In the present embodiment, an extending direction of the electrodes 104 and 106 is, for example, perpendicular to an extending direction of the flexible substrate 100. In another embodiment, the extending direction of the electrodes 104 and 106 can also be parallel to the extending direction of the flexible substrate 100. Moreover, the conductive line 108 is electrically connected to the electrode 104, and the conductive line 110 is electrically connected to the electrode 106.

Referring to FIG. 1B, an insulation layer 112 is formed on the electrodes 104 and 106 and the conductive lines 108 and 110. A material of the insulation layer 112 is, for example, a pressure sensitive material, and the insulation layer 112 is, for example, formed by a printing process. Then, an opening 114 is formed in the flexible substrate 100 aside the transparent conductive layer 102. It should be noticed that a position of the opening 114 is adjacent to one end of each of the conductive lines 108 and 110. Namely, the conductive lines 108 and the conductive line 110 extend to the opening 114, and the insulation layer 112 exposes the conductive lines 108 and 110 located around the opening 114.

Figure 2:
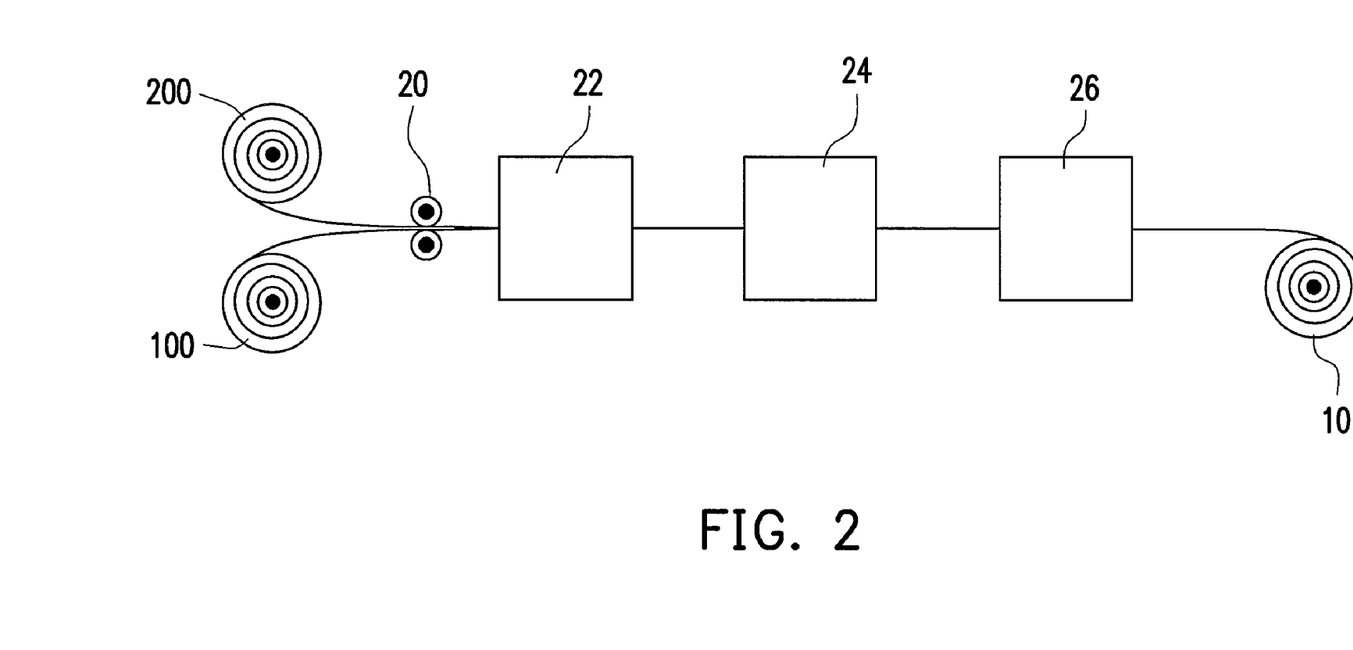
FIG. 2 is a schematic diagram illustrating a manufacturing process of a first structure roll according to an embodiment of the present invention.

It should be noticed that the above manufacturing steps are all performed according to the roll-to-roll process. FIG. 2 is a schematic diagram illustrating a manufacturing process of the first structure roll according to an embodiment of the present invention. Referring to FIG. 2, first, a photoresist material roll 200 and a flexible substrate 100 having a transparent conductive material layer formed thereon are laminated by a roller 20 and are sent to a patterning device 22. In the patterning device 22, processes such as exposing, developing, etching, photoresist removing, etc. are performed to form the transparent conductive layer 102 on the flexible substrate 100. Then, the flexible substrate 100 is sent to a printing device 24. In the printing device 24, a printing process is performed to form the electrodes 104 and 106, the conductive lines 108 and 110, and the insulation layer 112 on the transparent conductive layer 102. Then, the flexible substrate 100 is sent to a through-hole device 26. In the through-hole device 26, a through-hole process is performed to form the opening 114 in the flexible substrate 114 aside the transparent conductive layer 102. Then, the flexible substrate 100 is rolled to form the first structure roll 10.

Figure 3A:
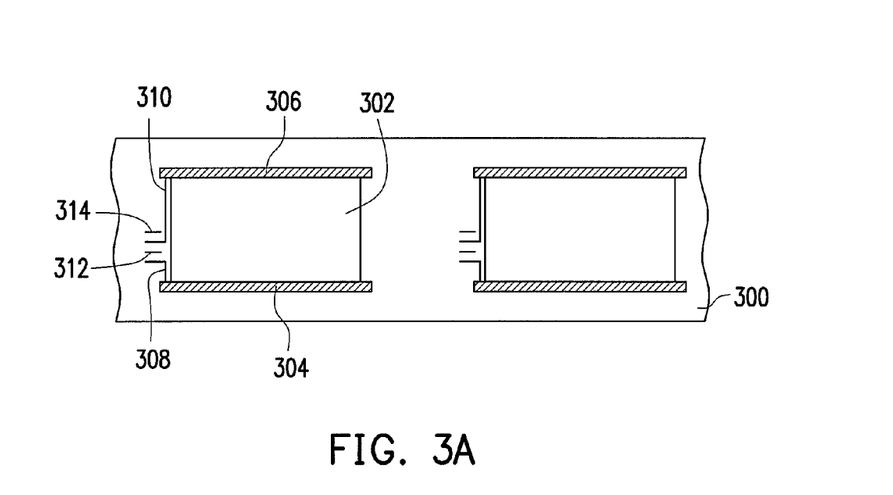
FIGS. 3A and 3B are top views illustrating a manufacturing process of a second structure roll according to an embodiment of the present invention.
Figure 3B:
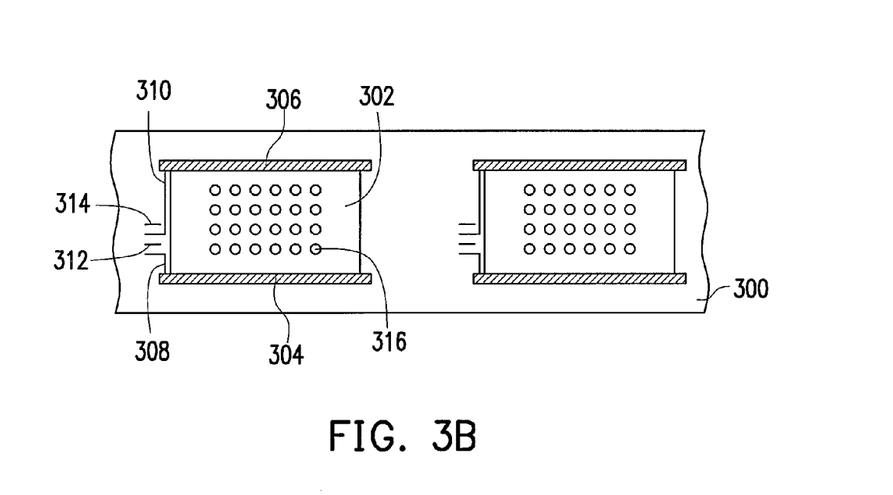

FIGS. 3A and 3B are top views illustrating a manufacturing process of a second structure roll according to an embodiment of the present invention. In the present embodiment, the second structure roll can be regarded as a lower structure of the touch panel. First, referring to FIG. 3A, a transparent conductive layer 302 is formed on a flexible substrate 300. A material of the flexible substrate 300 is, for example, polyethylene terephthalate or polycarbonate. A material of the transparent conductive layer 302 is, for example, a transparent conductive oxide (for example, indium tin oxide), an organic transparent conductive material (such as poly (3,4-ethylenedioxythiophene):polystyrene sulfonate) or carbon nanotube. A method of forming the transparent conductive layer 302 is the same to that of the transparent conductive layer 102, and therefore detailed description thereof is not repeated. Then, an electrode 304 and an electrode 306 parallel to the electrode 304 are formed on the transparent conductive layer 302. And conductive lines 308, 310, 312 and 314 parallel to the electrode 304 are formed on the transparent conductive layer 302. Material of the electrodes 304 and 306 are, for example, conductive silver pastes, and materials of the conductive lines 308, 310, 312 and 314 are, for example, also conductive silver pastes, though the present invention is not limited thereto. The electrodes 304 and 306 and the conductive lines 308, 310, 312 and 314 are, for example, formed by a printing process, though the present invention is not limited thereto. In the present embodiment, an extending direction of the electrodes 304 and 306 is, for example, parallel to an extending direction of the flexible substrate 300. Namely, in a touch panel to be formed in the follow-up process, the extending direction of the electrodes 304 and 306 is perpendicular to the extending direction of the electrodes 104 and 106. Moreover, the conductive line 308 is electrically connected to the electrode 304, and the conductive line 310 is electrically connected to the electrode 306. It should be noticed that a part of the conductive line 308, a part of the conductive line 310, the conductive lines 312 and 314 are located at a position corresponding to the opening 114 during a follow-up roll-to-roll process for laminating the first structure roll and the second structure roll.

Referring to FIG. 3B, spacers 316 are formed on the transparent conductive layer 302. A material of the spacer 316 is, for example, an insulating plastic material, and the spacers 316 are, for example, formed by a printing process. The spacers 316 are used for spacing the transparent conductive layer 102 and the transparent conductive layer 302 after the first structure roll and the second structure roll are laminated. In the present embodiment, the spacers 316 are, for example, spacer dots. Certainly, in another embodiment, the spacers 316 may have other shapes, though the present invention is not limited thereto.

Figure 4:
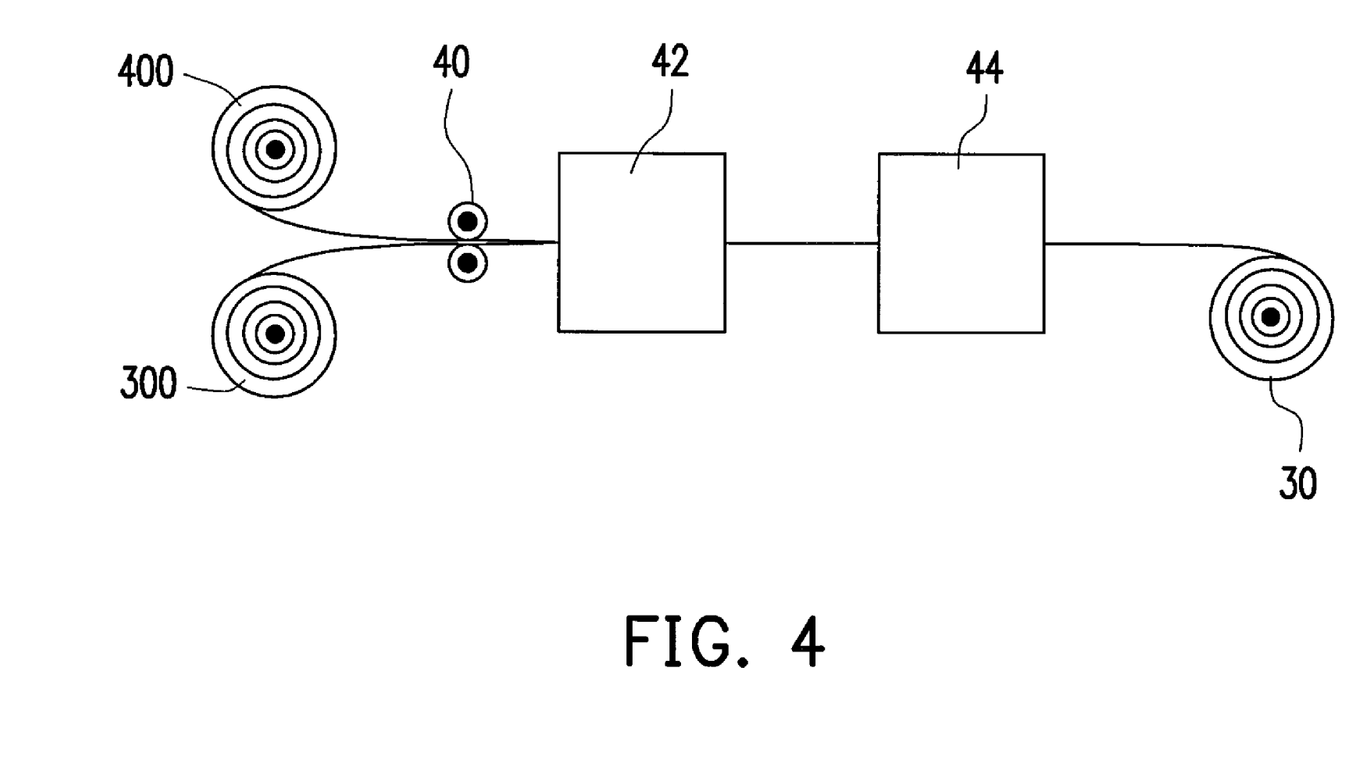
FIG. 4 is a schematic diagram illustrating a manufacturing process of a second structure roll according to an embodiment of the present invention.

Similarly, the above manufacturing steps are all performed according to the roll-to-roll process. FIG. 4 is a schematic diagram illustrating a manufacturing process of the second structure roll according to an embodiment of the present invention. Referring to FIG. 4, first, a photoresist material roll 400 and a flexible substrate 300 having a transparent conductive material layer formed thereon are laminated by a roller 40 and are sent to a patterning device 42. In the patterning device 42, processes such as exposing, developing, etching, photoresist removing, etc. are performed to form the transparent conductive layer 302 on the flexible substrate 300. Then, the flexible substrate 300 is sent to a printing device 44. In the printing device 44, a printing process is performed to form the electrodes 304 and 306, the conductive lines 308, 310, 312 and 314, and the spacers 316 on the transparent conductive layer 302. Then, the flexible substrate 300 is rolled to form the second structure roll 30.

Figure 5:
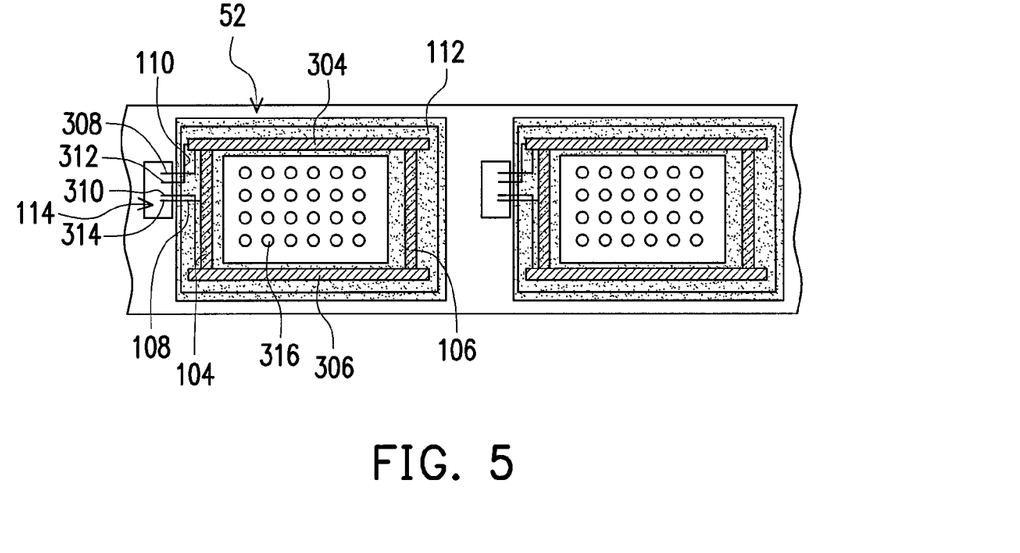
FIG. 5 is a top view of a touch panel roll according to an embodiment of the present invention.

After the first structure roll 10 and the second structure roll 30 are formed, the first structure roll 10 and the second structure roll 30 are laminated through the roll-to-roll process, and the first structure roll 10 and the second structure roll 30 are adhered through the insulation layer 112 (a pressure sensitive material), and the conductive lines 312 and 314 are respectively connected to the conductively lines 110 and 108 through conductive paste, so as to form the touch panel roll having a plurality of touch panel units (shown in FIG. 5, which is described in detail later). Further, after the first structure roll 10 and the second structure roll 30 are formed, the first structure roll 10 and the second structure roll 3Q are laminated through the roll-to-roll process, i.e. the transparent conductive layer 102 in the first structure roll 10 and the corresponding transparent conductive layer 302 in the second structure roll 30 are laminated to form the touch panel unit. During the roll-to-roll process, alignment marks formed on the first structure roll 10 and the second structure roll 30 in advance can be used for alignment, so that alignment error generated during the laminating process can be avoided. Moreover, since the laminating step is performed through the roll-to-roll process without using a manual approach, a manufacturing time and a labour cost can be greatly reduced.

It should be noticed that it is convenient to deliver the touch panel roll formed by laminating the first structure roll 10 and the second structure roll 30. Moreover, during a follow-up processing, the touch panel roll can be directly spread for cutting, so as to obtain a plurality of touch panels.

The touch panel roll formed by the roll-to-roll process is described in detail below.

Figure 6:
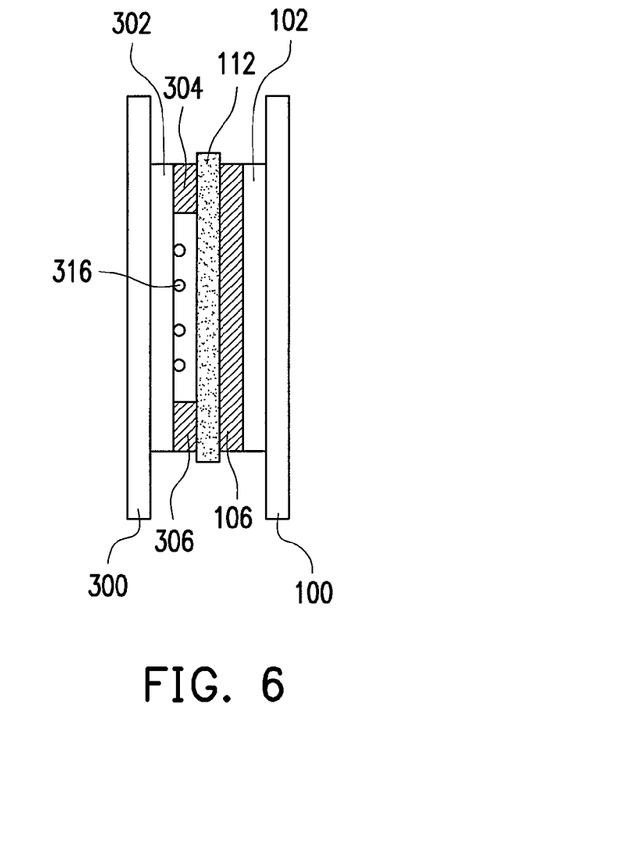
FIG. 6 is a side view of a touch panel roll according to an embodiment of the present invention.

FIG. 5 is a top view of a touch panel roll according to an embodiment of the present invention. FIG. 6 is a side view of the touch panel roll of FIG. 5. Referring to FIG. 5 and FIG. 6, the touch panel roll 50 includes a plurality of panel units 52. Each of the panel units 52 includes the flexible substrate 100 having the opening 114, the flexible substrate 300, the transparent conductive layers 102 and 302, the mutually parallel electrodes 104 and 106, the conductive line 108 electrically connected to the electrode 104, the conductive line 110 electrically connected to the electrode 106, the mutually parallel electrodes 304 and 306, the conductive line 308 electrically connected to the electrode 304, the conductive line 310 electrically connected to the electrode 306, the conductive lines 312 and 314, the insulation layer 112 and the spacers 316. The flexible substrate 300 is disposed opposite to the flexible substrate 100. The transparent conductive layer 102 is disposed on the flexible substrate 100. The electrodes 104 and 106 are disposed on the transparent conductive layer 102. And the conductive lines 108 and 110 are disposed on the flexible substrate 100, wherein the conductive lines 108 and 110 extend to the opening 114. The transparent conductive layer 302 is disposed on the flexible substrate 300. The electrodes 304 and 306 are disposed on the transparent conductive layer 302, wherein the extending direction of the electrodes 304 and 306 is perpendicular to the extending direction of the electrodes 104 and 106. The conductive lines 308, 310, 312 and 314 are disposed on the flexible substrate 300. And the opening 114 exposes a part of the conductive line 308, a part of the conductive line 310, the conductive lines 312 and 314. The conductive lines 312 and 314 are respectively connected to the conductive lines 110 and 108. The insulation layer 112 is disposed between the transparent conductively layer 102 and the transparent conductive layer 302 for covering the electrodes 104, 106, 304 and 306, a part of the conductive line 108, a part of the conductive line 110, a part of the conductive line 308 and a part of the conductive line 310. The spacers 316 are disposed between the transparent conductively layer 102 and the transparent conductive layer 302 for spacing the transparent conductively layer 102 and the transparent conductive layer 302.

In the present embodiment, since the conductive lines 108 and 110 on the upper layer (the first structure roll 10) are electrically connected to the conductive lines 314 and 312 on the lower layer (the second structure roll 30), the conductive lines connected to the electrodes 104, 106, 304 and 306 can be located on a same plane. Since the conductive lines connected to the electrodes are located on the same plane and are all exposed by the opening 114, in a follow-up fabrication process for connecting a circuit board to the touch panel, the circuit board can be connected to the conductive lines by simply attaching the circuit board to the opening 114. Namely, the step of attaching the circuit board is simplified, and the circuit board can even be attached without using a manual approach.

The touch panel roll attached with the circuit board is described in detail below with reference of FIG. 7 and FIG. 8.

Figure 7:
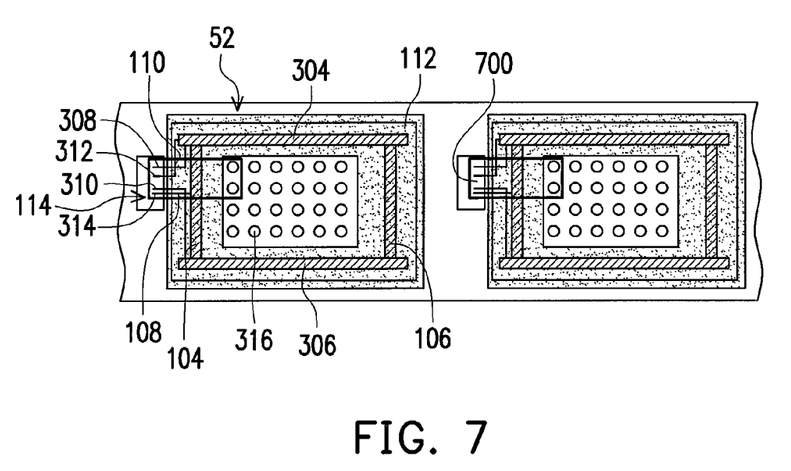
FIG. 7 is a top view of a touch panel roll attached with a circuit board according to an embodiment of the present invention.
Figure 8:
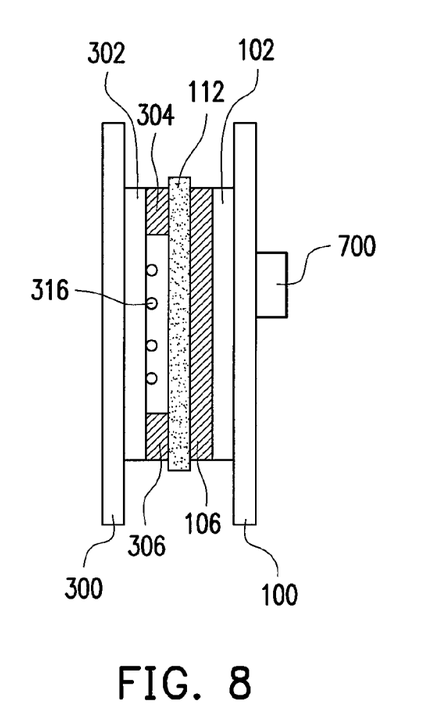
FIG. 8 is a side view of a touch panel roll attached with a circuit board according to an embodiment of the present invention.

FIG. 7 is a top view of a touch panel roll attached with a circuit board according to an embodiment of the present invention. FIG. 8 is side view of the touch panel roll attached with the circuit board according to an embodiment of the present invention. Referring to FIG. 7 and FIG. 8, after the first structure roll 10 and the second structure roll 30 are laminated, and after the conductive lines 312 and 314 are respectively connected to the conductive lines 110 and 108 through the conductive paste, one end of the circuit board 700 is electrically connected to the conductive lines 308, 310, 312 and 314 through the opening 114. It should be noticed that another end of the circuit board 700 can be disposed on the panel unit 52 to facilitate rolling the touch panel roll 50.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for manufacturing a touch panel roll, comprising:
    providing a first structure roll, and a method of forming the first structure roll comprising:
        forming a first transparent conductive layer on a first flexible substrate;
        forming a first electrode and a second electrode parallel to the first electrode on the first transparent conductive layer;
        forming a first conductive line electrically connected to the first electrode and a second conductive line electrically connected to the second electrode on the first flexible substrate;
        forming an insulation layer on the first electrode, the second electrode, the first conductive line and the second conductive line; and
        forming an opening in the first flexible substrate aside the first transparent conductive layer, wherein the first conductive line and the second conductive line extend to the opening, and the insulation layer exposes the first conductive line and the second conductive line located around the opening;
    providing a second structure roll, and a method of forming the second structure roll comprising:
        forming a second transparent conductive layer on a second flexible substrate;
        forming a third electrode and a fourth electrode parallel to the third electrode on the second transparent conductive layer, wherein an extending direction of the third electrode and the fourth electrode is perpendicular to an extending direction of the first electrode and the second electrode;
        forming a third conductive line electrically connected to the third electrode, a fourth conductive line electrically connected to the fourth electrode, and a fifth conductive line and a sixth conductive line on the second flexible substrate, wherein a part of the third conductive line, a part of the fourth conductive line, the fifth conductive line and the sixth conductive line are located at a position corresponding to the opening; and
        forming a spacer on the second transparent conductive layer; and
    laminating the first structure roll and the second structure roll through a roll-to-roll process, so that the fifth conductive line and the sixth conductive line are respectively connected to the first conductive line and the second conductive line.

2. The method for manufacturing the touch panel roll as claimed in claim 1, wherein a method of forming the first transparent conductive layer comprises:
    forming a transparent conductive material layer on the first flexible substrate;
    laminating a photoresist material roll and the first flexible substrate through a roll-to-roll process; and
    performing a patterning process to remove a part of the transparent conductive material layer.

3. The method for manufacturing the touch panel roll as claimed in claim 1, wherein a method of forming the first electrode, the second electrode, the first conductive line and the second conductive line comprises performing a printing process.

4. The method for manufacturing the touch panel roll as claimed in claim 1, wherein a method of forming the insulation layer comprises performing a printing process.

5. The method for manufacturing the touch panel roll as claimed in claim 1, wherein a method of forming the second transparent conductive layer comprises:
    forming a transparent conductive material layer on the second flexible substrate;
    laminating a photoresist material roll and the second flexible substrate through a roll-to-roll process; and
    performing a patterning process to remove a part of the transparent conductive material layer.

6. The method for manufacturing the touch panel roll as claimed in claim 1, wherein a method of forming the third electrode, the fourth electrode, the third conductive line, the fourth conductive line, the fifth conductive line and the sixth conductive line comprises performing a printing process.

7. The method for manufacturing the touch panel roll as claimed in claim 1, wherein a method of forming the spacer comprises performing a printing process.

8. The method for manufacturing the touch panel roll as claimed in claim 1, wherein the fifth conductive line and the sixth conductive line are respectively connected to the first conductive line and the second conductive line through a conductive paste.

9. The method for manufacturing the touch panel roll as claimed in claim 1, wherein after the step of respectively connecting the fifth conductive line and the sixth conductive line to the first conductive line and the second conductive line, the method further comprises electrically connecting a circuit board to the third conductive line, the fourth conductive line, the fifth conductive line and the sixth conductive line through the opening.

10. A touch panel roll, comprising a plurality of panel units, and each of the panel units comprising:

a first flexible substrate, having an opening;

a second flexible substrate, disposed opposite to the first flexible substrate;

a first transparent conductive layer, disposed on the first flexible substrate;

a first electrode and a second electrode parallel to the first electrode, disposed on the first transparent conductive layer;

a first conductive line electrically connected to the first electrode, and a second conductive line electrically connected to the second electrode, disposed on the first flexible substrate, wherein the first conductive line and the second conductive line extend to the opening;

a second transparent conductive layer, disposed on the second flexible substrate;

a third electrode and a fourth electrode parallel to the third electrode, disposed on the second transparent conductive layer, wherein an extending direction of the third electrode and the fourth electrode is perpendicular to an extending direction of the first electrode and the second electrode;

a third conductive line electrically connected to the third electrode, a fourth conductive line electrically connected to the fourth electrode, a fifth conductive line and a sixth conductive line, disposed on the second flexible substrate, wherein the opening exposes a part of the third conductive line, a part of the fourth conductive line, the fifth conductive line and the sixth conductive line, and the fifth conductive line and the sixth conductively line are respectively connected to the first conductive line and the second conductive line;

an insulation layer, disposed between the first transparent conductive layer and the second transparent conductive layer, for covering the first electrode, the second electrode, the third electrode, the fourth electrode, a part of the first conductive line, a part of the second conductive line, a part of the third conductive line and a part of the fourth conductive line;

a spacer, disposed between the first transparent conductive layer and the second transparent conductive layer.

11. The touch panel roll as claimed in claim 10, wherein a material of the first flexible substrate and the second flexible substrate comprises polyethylene terephthalate or polycarbonate.

12. The touch panel roll as claimed in claim 10, wherein a material of the first transparent conductive layer and the second transparent conductive layer comprises a transparent conductive oxide, an organic transparent conductive material or carbon nanotube.

13. The touch panel roll as claimed in claim 12, wherein the transparent conductive oxide comprises indium tin oxide.

14. The touch panel roll as claimed in claim 12, wherein the organic transparent conductive material comprises poly (3,4-ethylenedioxythiophene):polystyrene sulfonate.

15. The touch panel roll as claimed in claim 10, wherein a material of the first electrode, the second electrode, the third electrode and the fourth electrode comprises conductive silver paste.

16. The touch panel roll as claimed in claim 10, wherein a material of the insulation layer comprises a pressure sensitive material.

17. The touch panel roll as claimed in claim 10, further comprising a circuit board electrically connected to the third conductive line, the fourth conductive line, the fifth conductive line and the sixth conductive line through the opening.

* * * * *